United States Patent [19]

Roberts et al.

[11] Patent Number: 4,511,124
[45] Date of Patent: Apr. 16, 1985

[54] METHOD AND COMPOSITION FOR FLUIDIZATION OF ACCUMULATED PIT SCRAP IN SOAKING PITS

[75] Inventors: Charles D. Roberts, Longview; Ben R. Cave, Avinger, both of Tex.

[73] Assignee: Lone Star Steel Company, Dallas, Tex.

[21] Appl. No.: 491,166

[22] Filed: May 3, 1983

[51] Int. Cl.$^3$ .............................................. B08B 7/04
[52] U.S. Cl. ...................................... 266/44; 106/313; 134/5; 266/135; 432/4; 501/155
[58] Field of Search .................... 106/313, DIG. 1; 264/30; 266/44, 135; 501/69, 155, 904; 134/5; 432/4

[56] References Cited

U.S. PATENT DOCUMENTS

| | | | |
|---|---|---|---|
| Re. 26,960 | 8/1966 | Hess | 72/200 |
| 1,490,944 | 4/1924 | Simpson | 72/39 |
| 2,509,866 | 5/1950 | Hemminger | 122/239 |
| 2,855,289 | 10/1958 | Bowden | 75/30 |
| 2,987,411 | 6/1961 | Minnick | 106/288 B |
| 2,990,610 | 7/1961 | Luckerath et al. | 29/528 |
| 3,053,704 | 9/1962 | Munday | 148/20.3 |
| 3,178,321 | 4/1965 | Satterfield | 148/13.1 |
| 3,197,346 | 7/1965 | Munday | 148/13 |
| 3,250,643 | 5/1966 | Sergent | 134/2 |
| 3,304,210 | 2/1967 | Lofstrom | 148/134 |
| 3,345,841 | 10/1967 | Phelan et al. | 72/39 |
| 3,391,915 | 7/1968 | Morgan | 266/3 |
| 3,475,230 | 10/1969 | Carter | 148/13.1 |
| 3,721,547 | 3/1973 | Dvorak et al. | 75/30 |
| 3,775,180 | 11/1973 | Hirata et al. | 134/7 |
| 3,804,642 | 4/1974 | Rumbold et al. | 106/38.9 |
| 3,827,922 | 8/1974 | Boggs et al. | 148/27 |
| 3,985,546 | 10/1976 | Mrdjenovich | 75/30 |
| 3,998,624 | 12/1976 | Harris et al. | 75/30 |
| 4,137,071 | 1/1979 | Mrdjenovich | 75/30 |
| 4,350,324 | 9/1982 | Kramer | 266/44 |

FOREIGN PATENT DOCUMENTS

| | | | |
|---|---|---|---|
| 197500 | 5/1923 | United Kingdom | 501/904 |
| 1534249 | 11/1978 | United Kingdom | 501/69 |

OTHER PUBLICATIONS

N. L. Bowen and J. F. Schairer, "System, FeO–SiO$_2$," Am. Jour. Sc. Fifth Series, vol. XXIV, No. 141, Sep., 1932, pp. 177–213.

R. Schuhmann, Jr. and P. J. Ensio, "Thermodynamics of Iron–Silicate Slags: Slags Saturated with Gamma Iron," Trans. AIME, May 1951, vol. 191, pp. 401–411.

R. P. Goel, H. H. Kellogg, and J. Larrain, "Mathematical Description of the Thermodynamic Properties of the Systems Fe–O and Fe–O and Fe–O–SiO$_2$," Met. Trans., vol. 11B, Mar. 1980, pp. 107–117.

*Primary Examiner*—Helen M. McCarthy
*Attorney, Agent, or Firm*—Donald E. Degling

[57] ABSTRACT

A composition for use in fluidizing accumulated pit scrap in ingot soaking pits is provided which contains from about 38 to about 56 wt. % SiO$_2$, from about 2 to about 4 wt. % C, and from about 38 to about 56 wt. % FeO. A method is also provided according to which an effective amount of the above composition is added to the pit and the pit maintained at a temperature and for a time sufficient to fluidize the accumulated pit scrap. The fluidized pit scrap is then removed by drainage or mechanical means.

4 Claims, No Drawings

METHOD AND COMPOSITION FOR FLUIDIZATION OF ACCUMULATED PIT SCRAP IN SOAKING PITS

BACKGROUND OF THE INVENTION

The present invention relates to the art of removing pit scrap which accumulates during the processing of steel. More particularly, the present invention is directed to a composition for and method of fluidization of accumulated pit scrap in ingot soaking pits.

As a first step in the generalized steelmaking process, iron-bearing raw materials (principally iron oxides) are reduced to molten iron or pig iron in a blast furnace using coke carbon as the reducing agent. In the process, the pig iron absorbs from about 3 to about 4.5% carbon. Since most modern carbon steel contains considerably less than 1.0% carbon, the excess carbon is removed by controlled oxidation of mixtures of molten pig iron and melted iron steel scrap in steelmaking furnaces to produce carbon steels of the desired carbon content.

Modern steelmaking processes produce molten or liquid steel. After the molten steel has attained the desired chemical composition, it is tapped or poured from the furnace into a ladle, from which the steel is teemed into tall, usually rectangular, molds. After being removed from the molds, the resulting ingots are typically reheated to a uniform temperature and rolled or forged into various shapes. This so-called semifinished steel is then subjected to various forms of mechanical treatment (hot and cold rolling, forging, extruding, drawing, and the like) to form the finished product.

Soaking pits are typically employed to bring steel ingots to a temperature suitable for treatment in a rolling mill. These pits are generally deep chambers or furnaces of various shapes, most commonly square or rectangular, designed to permit uniform heating of ingots to the desired temperature with a minimum of overheating of the surface of the ingot. The ingots are placed in an upright position in the pits through an opening in the top which is fitted with a removable cover.

Adjustments for lack of uniform temperature distribution are typically made by firing at a uniform rate for a period of time, followed by a period during which the pit is dampered and minimal fuel is admitted. During the latter period, the steel is "soaked" to equalize the temperture between ingots in the pit and between the surface and the interior of individual ingots. This practice, known as "firing and dampering", provides a product with a uniform temperature at high production rates in spite of any uneven heating during the firing stage.

There is a wide variation in soaking pit productivity, which is related to live pit-hole area. This is the area available in the pit on which ingots can be placed for heating. With proper loading, live pit-hole area amounts to approximately 35 to 40% in modern pits; a maximum of about 50% is the best that can presently be achieved. An average month's practice with modern soaking pits is heating about 30 to 100 tons of ingots per hour per 1000 square feet of live pit-hole area.

Pit scrap, a form of waste material derived principally from scale (iron oxides) which forms on the surface of the ingots, accumulates on the sides and bottom of the soaking pits during use, reducing their service life. Over time, the accumulation of pit scrap significantly reduces the live pit-hole area. Removal of the pit scrap through conventional means is difficult and requires a periodic downtime at some expense. While a routine dipping or scraping of pit scrap during operating periods may prolong the service life of a given pit, this technique is effective only when loose, fluid pit scrap is present.

With the use of ever-increasing firing rates in soaking pits, there is also a tendency towards an increase in oxygen level in the pit scrap. This increase in oxygen content leads to an elevation of from 200° F. to 300° F. in the theoretical melting points of the mixtures of FeO and $Fe_3O_4$ typically found in pit scrap. These higher oxide mixture melting temperatures have made it extremely difficult to fluidize the pit scrap in soaking pits, even through intense firing of empty soaking pits.

SUMMARY OF THE INVENTION

A composition is provided for use in fluidizing accumulated pit scrap in soaking pits during routine operation of the pits. The fluidizing composition contains from about 38 to about 56 wt.% $SiO_2$, from about 38 to about 56 wt.% FeO, and from about 2 to about 4 wt.% C. The composition optionally contains up to about 18 wt.% $Fe_3O_4$, and up to about 6 wt.% impurities.

The method of the present invention is practiced by adding an effective amount of the composition to a soaking pit containing accumulated pit scrap and maintaining the pit at a temperature and for a time sufficient to fluidize the accumulated pit scrap, and then removing the fluidized pit scrap. Fluidization typically occurs about 3 to about 4 hours after addition. The pits can be and preferably are charged with ingots and used normally during practice of the method.

DESCRIPTION OF THE PREFERRED EMBODIMENTS

The composition or fluidizing mixture of the present invention contains, by weight, from about 38 to about 56 wt.% $SiO_2$, preferably about 39 to about 42 wt.% $SiO_2$, from about 2 to about 4 wt.% C, as recarburizer, and from about 38 to about 56 wt.% FeO. The FeO content can exceed 56% when the $Fe_3O_4$ content of the fluidizing mixture is near 0 wt.%. The mixture optionally contains up to about 10%, in total, of free iron and various impurities present in the source materials for the $SiO_2$, C, and FeO. Amounts in excess of 10% adversely effect the use of the composition as a fluidizing agent. $Fe_3O_4$ may optionally be present in the composition, and is often present as an impurity, in an amount up to about 18 wt.%. While higher amounts of $Fe_3O_4$ can be present, 25 wt.% is a practical maximum since, if exceeded, fluidizing action is inhibited.

A particularly preferred composition comprises about 54 wt.% $SiO_2$, about 2 wt.% C, and about 38 wt.% FeO with about 6 wt.% free iron and impurities.

$SiO_2$ is preferably provided in the form of clean silica sand. The FeO is advantageously provided as scarfing kerf, which is the surface material removed from semifinished steel in the mill between processing stages and which typically contains about 85 wt.% FeO, along with about 12 wt.% $Fe_3O_4$ and about 1 wt.% $SiO_2$, with a typical total iron content of about 72 wt.%. The source of FeO should optimally contain 85 wt.% FeO, since it has been observed that when scarfing kerf having a lower FeO content is used in formulating the composition, the composition tends not to react with the pit scrap. The carbon is preferably provided as granulated recarburizer, which is typically made from used electric arc furnace electrodes.

Depending on the composition of the ingots treated, the composition of the pit scrap which accumulates in the soaking pit will vary over a rather broad range, particularly with respect to the amounts of FeO and $Fe_3O_4$ present in the pit scrap. Typical pit scrap (primarily mixtures of FeO, $Fe_3O_4$ and $SiO_2$) is characterized by four physicochemical constituents:

Type I pit scrap: a low viscosity, free running liquid at pit operating temperatures, it is characterized by a high FeO content and a low $Fe_3O_4$ content.

Type II pit scrap: a solid at pit operating temperatures, this material rapidly liquifies to a low viscosity fluid if "coaxed" from the pit bottom with a burner. In general, Type II is characterized by a lower FeO content than Type I, but, like Type I scrap, has a low $Fe_3O_4$ content.

Type III pit scrap: a high viscosity fluid at operating temperatures, this constituent has an FeO content comparable to that of Type II but has a higher $Fe_3O_4$ content.

Type IV pit scrap: a solid at temperatures well above operating levels, this material is characterized by a very high $Fe_3O_4$ content and a low FeO content.

In general, it has been found that pit scrap with a high $Fe_3O_4$ content remains solid even at high operating temperatures. From a comparison of the compositions of different pit scraps and their freezing points, it has been determined that pit scrap having a low $Fe_3O_4$ content will exhibit freezing ranges several hundred degrees lower than pit scrap having a high $Fe_3O_4$ content.

According to the method of the present invention, an effective amount of the composition is added to the soaking pit and the pit maintained at a temperature and for a time sufficient to fluidize the pit scrap which has accumulated along the sides and, in particular, on the floor of the pit. The temperature will typically be at least about 2150° F., preferably at least about 2400° F. and, more preferably, within the range of from about 2400° F. to about 2500° F. The amount of the composition added will depend upon the type of accumulated pit scrap and the relative concentrations of the essential elements present in the composition. Preferably, the composition is added in an amount of about 1 part by weight per about 5 parts by weight of accumulated pit scrap. The composition is distributed over the pit scrap, which, during operation of the soaking pit, becomes fluid after several hours, typically about 3 to 4 hours after addition. Pits may be charged with ingots during this process and, after the ingots are drawn, the molten pit scrap is typically removed by mechanical means.

The addition of the composition of the present invention effectively lowers the melting point of the soaking pit scrap to typical soaking pit operating temperatures, which are within the range of from about 2150° F. to about 2500° F. and, more typically, from about 2450° F. to 2470° F. The composition reacts with the pit scrap increasing the average $SiO_2$ concentration, reducing $Fe_3O_4$ to FeO, which results in a freezing point depression for the pit scrap through formation of a low melting point mixed oxide reaction product of $FeO$-$Fe_3O_4$-$SiO_2$, and increasing the density of the pit scrap through depletion of the compounded oxygen. The ideal eutectic for this system occurs at 51.8% FeO-36% $Fe_3O_4$-12.5% $SiO_2$. The fluidized pit scrap, which can be fluidized during a normal operational cycle of the pit, is then removed from the floor of the pit by drainage or mechanical means.

The effectiveness of the method of the present invention may be enhanced by modification of the soaking pits. Providing low trough walls limits bottom accumulation and altering the slope of the runoff areas aids in removal of the fluidized pit scrap.

The following examples present illustrative but non-limiting embodiments of the present invention.

EXAMPLE 1

To a soaking pit heavily encrusted with pit scrap and having an irregularly shaped and sloped solid bottom, was added approximately 12,000 pounds of the following composition containing, by weight:

$SiO_2$: 54% (as clean silica sand)
FeO: 38% (as 85% FeO scarfing kerf)
C: 2% (as recarburizer)
Free Fe and various impurities: 6%

Within two hours, a constant stream of liquid pit scrap was observed running into the basement slag pockets. This flow continued uninterruptedly for approximately ten hours until the pit was opened for ingot rolling and bottom dipping. After removal of loosened material, the pit once again continued to drain into the slag pockets for several hours. A total of thirteen grab bucket loads, five loader buckets, and one 2–3 ton "oyster" of solidified liquid were removed from the pit bottom.

EXAMPLE 2

Chemical analyses were performed on samples of the four typical types of pit scrap discussed above. The results are summarized below in Table I.

TABLE I

| | SUMMARY OF TYPICAL PIT SCRAP ANALYSES | | | | |
|---|---|---|---|---|---|
| | Wt. % | | | | |
| Scrap Type | Total Fe | FeO | $Fe_3O_4$ | $SiO_2$ | $Al_2O_3$ |
| I | 50.2 | 62.3 | 2.7 | 18.2 | 9.5 |
| II | 47.4 | 48.2 | 9.1 | 31.8 | 6.5 |
| III | 52.8 | 44.1 | 26.6 | 16.2 | 6.9 |
| IV | 52.4 | 29.4 | 42.3 | 13.8 | 8.5 |

EXAMPLE 3

In order to determine the relative freezing ranges of the four types of pit scrap, samples of each pit scrap type were prepared and then melted by radio frequency in a Roto-Cast 500 system (manufactured by Midwest Instruments Company, Hartland, Wis.) after which they were allowed to cool to the solid state while pyrometric temperature measurements were taken. While high accuracy freezing point data were not obtained due to pyrometric color errors associated with the protective glass elements of the Roto-Cast 500 system, it is believed that relative differences in the freezing ranges of the samples were accurately determined. As shown in Table II below, low $Fe_3O_4$ content pit scrap samples exhibited freezing ranges 180°–200° F. lower than the high $Fe_3O_4$ pit scrap samples.

TABLE II

| PIT SCRAP FREEZING RANGES | | | |
|---|---|---|---|
| | Wt. % | | |
| Scrap Type | FeO | $Fe_3O_4$ | Freezing Range (°F.) |
| I | 62.3 | 2.7 | 1890–1880 |
| I | 56.3 | 5.5 | 1900–1840 |
| II | 36.2 | 9.1 | 1850–1830* |
| III or IV | 37.6 | 45.8 | 2190–2070 |

TABLE II-continued

PIT SCRAP FREEZING RANGES

| | Wt. % | | |
|---|---|---|---|
| Scrap Type | FeO | Fe$_3$O$_4$ | Freezing Range (°F.) |
| IV | 23.5 | 49.0 | 2100–2080 |

*High silica content (32%) responsible for low melting range.

EXAMPLE 4

On a laboratory-scale basis, compositions were prepared with varying percentages of FeO, SiO$_2$, Fe (free), and C. Through freezing range determinations and calculations of anticipated effective chemical ranges, a trial mixture for operational use was selected. This composition comprised, by weight:

SiO$_2$: 54% (as clean silica sand)
FeO: 38% (as 85% scarfing kerf)
C: 2% (as recarburizer)
Free Fe and various impurities: 6%

The results of the laboratory testing of this composition and its effect on solid pit scrap types are summarized in Table III. Of particular importance was the successful reduction of solid Fe$_3$O$_4$ to liquid FeO.

TABLE III

RESULTS OF ROTO-CAST INERT ATMOSPHERE MELTING TESTS OF FLUIDIZING COMPOSITION WITH TYPICAL PIT SCRAPS*

| | Wt. % | | |
|---|---|---|---|
| Pit Scrap Type | Total Fe | FeO | Fe$_3$O$_4$ |
| II - Before Treatment | 47.4 | 48.2 | 9.1 |
| II - After Treatment | 44.8 | 56.2 | 1.8 |
| IV - Before Treatment | 52.4 | 29.4 | 42.3 |
| IV - After Treatment | 50.4 | 57.9 | 7.9 |
| Composite (I–IV) Before Treatment | 61.2 | 37.6 | 45.8 |
| Composite (I–IV) After Treatment | 58.6 | 70.1 | 6.1 |

*Composition added at a ratio of 1 part per 5 parts of pit scrap, by weight. Analyses conducted on scrap prior to fluxing addition and after melting was complete.

EXAMPLE 5

A fluidizing composition containing the essential components of the present invention was added, at 10:30 a.m. on day 1, to a pit containing a 5 foot thick accumulation of pit scrap. When the pit was changed at 4:30 p.m., the composition had not yet reacted. On day 2, ingots were drawn and the pit temperature was raised to and maintained at 2520° F. for 25 minutes at which time the composition still had not reacted. On day 3, the composition reacted with the pit scrap which became fluid and ran out. Due to this delayed action, the scarfing kerf used in the composition was analyzed and found to vary from the desired 85% FeO concentration, as shown below:

TABLE IV

| ANALYSIS OF SCARFING KERF | |
|---|---|
| Component | Wt. % |
| Total Fe | 66.60 |
| FeO | 60.42 |
| Fe$_3$O$_4$ | 28.23 |
| SiO$_2$ | 6.83 |

As a result of the use of this low FeO scarfing kerf, the FeO:SiO$_2$ ratio for the composition was too low. Repeated charging of the pit with ingots increased the FeO content from ingot scale until runout occured on day 3. The results show that the wt.% of the essential components in the present composition is critical since only a small amount of variance in the composition can be tolerated.

EXAMPLE 6

Sixteen soaking pits were experimentally treated with a composition of the present invention at regular intervals during a three month period of otherwise routine operation. Slag tenders pulled the sixteen pits a total of 3,052 times during the three month period, removing approximately 2,580 pounds of fluidized pit scrap each time for a total of about 7,874,160 pounds, The total down time for cleaning the sixteen pits during those three months was 23 days.

The terms and expressions which have been employed herein are used as terms of description and not of limitation, and there is no intention in the use of such terms and expressions to exclude any equivalents of the features shown and described or portions thereof.

We claim:

1. A method of fluidizing accumulated pit scrap, primarily mixtures of FeO, Fe$_3$O$_4$ and SiO$_2$, in a soaking pit, comprising adding to the soaking pit an effective fluidizing amount of a composition consisting essentially of about 38 to about 56 wt. % SiO$_2$ in the form of clean silica sand, from about 38 to 56 wt. % scarfing kerf containing about 85% FeO, and from about 2 to about 4 wt. % C, and maintaining the soaking pit at a temperature and for a time sufficient to fluidize the accumulated pit scrap.

2. The method of claim 1, wherein the composition is added in an amount of about 1 part of the composition to about 5 parts of the accumulated pit scrap, by weight.

3. The method of claim 1 wherein the temperature is at least about 2150° F.

4. The method of claim 3 wherein the temperature is within the range of from about 2400° F. to about 2500° F.

* * * * *